United States Patent [19]

Herzl

[11] 4,048,854
[45] Sept. 20, 1977

[54] SYSTEM FOR DETERMINING THE RATIO OF OIL TO WATER IN A METERED FLUID STREAM

[75] Inventor: Peter J. Herzl, Morrisville, Pa.

[73] Assignee: Fischer & Porter Co., Warminster, Pa.

[21] Appl. No.: 724,455

[22] Filed: Sept. 17, 1976

Related U.S. Application Data

[62] Division of Ser. No. 668,457, May 19, 1976, Pat. No. 4,010,645.

[51] Int. Cl.$^2$ .............................................. G01F 1/32
[52] U.S. Cl. .............................. 73/194 VS; 73/61.1 R; 235/151.35
[58] Field of Search ............. 73/32 A, 61.1 R, 194 R, 73/194 E, 194 VS; 235/151.34, 151.35

[56] References Cited

U.S. PATENT DOCUMENTS

| | | | |
|---|---|---|---|
| 3,719,073 | 3/1973 | Mahon | 73/194 |
| 3,776,033 | 12/1973 | Herzl | 73/194 |
| 3,906,198 | 9/1975 | November | 73/61.1 R |
| 3,992,939 | 11/1976 | November | 73/194 |

Primary Examiner—Herbert Goldstein

[57] ABSTRACT

A system for metering a fluid stream constituted by a mixture of oil and water to determine the volumetric ratio of oil-to-water in the stream. The system includes a vortex meter through which the stream is conducted to produce a meter signal whose frequency depends on the volumetric flow and whose amplitude depends on the mass flow of the stream. Derived from the meter signal is a volumetric signal that is solely a function of frequency and a mass flow signal that is solely a function of amplitude, the volumetric signal being divided by the mass flow signal to produce a density signal. The volumetric and density signals are fed to a computer to which is also applied a temperature signal that depends on the temperature of the metered stream. The computer has stored therein the relationship between water density and temperature and that between oil density and temperature, and it functions in response to the signals applied thereto to determine the respective volumes of oil and water in the mixture.

8 Claims, 2 Drawing Figures

4,048,854

SYSTEM FOR DETERMINING THE RATIO OF OIL TO WATER IN A METERED FLUID STREAM

RELATED APPLICATION

This application is a division of my copending application Ser. No. 668,457, now U.S. Pat. No. 4,010,645 filed May 19, 1976.

BACKGROUND OF INVENTION

This invention relates generally to apparatus for measuring the volumetric and mass flow of gases and liquids, and more particularly to a vortex flowmeter system capable of metering fluids of different densities and of providing correct readings for each fluid.

Petroleum found in rock formations is recovered therefrom by drilling a well. After completion, a well may flow freely, producing thousands of barrels a day as a result of high "reservoir" pressure generated by natural gas trapped with the oil, or by the pressure of water layers above the oil. In order to increase oil recovery, it is common practice to pump water or gas down one well to increase the flow from adjacent wells in the same rock formation.

Thus emerging from the oil well is not merely oil, for the output may take the form of a stream of oil interspersed with gas, the alternate flow of gas and oil being random in nature. Or the oil output of the well may be intermingled with water.

It is desirable in an oil recovery installation to measure the output of the wells so that one can maintain proper productivity records. While vortex-type flowmeters are capable of measuring volumetric flow and mass flow, they are incapable of discriminating between gas and liquid, and their readings are therefore not a true indication of how much oil has been produced, as distinguished from water and gas also yielded by the producing well.

My prior U.S. Pat. No. 3,776,033 discloses a vortex-type flowmeter which is useful in many industrial processes and gas supply systems, the meter being capable of measuring the mass flow as well as the volumetric flow of fluids being treated or supplied. A meter of this type is operative in those situations in which the fluid being metered is either entirely in liquid or in gas form, for then the meter would indicate the volumetric flow of the fluid and its mass flow. The same meter can also be made to indicate the density of the fluid being metered.

But where the fluid flowing through a meter of this type is intermittently in liquid and gaseous form or is a mixture of liquids of different density, the meter is incapable of providing indications that distinguish between liquid and gas or between liquids of different density. Hence such meters are not useable in oil recovery installations or in other situations in which the fluid stream is of variable density.

SUMMARY OF INVENTION

In view of the foregoing, it is the main object of this invention to provide a vortex-type flowmeter system capable of metering fluids of different densities and of providing correct mass flow and volumetric flow readings for each fluid.

More particularly, it is an object of this invention to provide a system of the above-noted type in which separate indicators are provided for liquid-mass flow, liquid-volumetric flow, gas-mass flow and gas-volumetric flow, these indicators being responsive only to signals representative of the values to be indicated, whereby in a system in which the fluid stream being metered contains gas interspersed with liquid, separate readings are derived from the gas and liquid in the stream.

Yet another object of this invention is to provide a system for use with a fluid stream containing a mixture of two liquids of different densities, the system determining the relative amounts of these liquids in the stream.

Briefly stated, these objects are accomplished in a system in which the gas-liquid fluid stream to be metered is conducted through a mass flow vortex-type meter whose output signal has a frequency proportional to volumetric flow and an amplitude proportional to mass flow, the output signal being applied by a selector switch either to a liquid-mass flow indicator or to a gas-mass flow indicator.

The switch is responsive to a density signal whereby when the density signal reflects the passage of liquid through the meter, the output signal of the meter is supplied to the liquid indicator and when the density signal reflects the passage of gas, the signal output is applied to the gas indicator.

The density signal is generated by a density detector adapted to convert the output signal into a first analog voltage representing the frequency of the output signal (hence volumetric flow) and into a second analog voltage representing the amplitude of the output signal (hence mass flow), the second voltage being divided by the first to produce a third analog voltage constituting the density signal.

OUTLINE OF THE DRAWINGS

For a better understanding of the invention as well as other objects and further features thereof, reference is made to the following detailed description to be read in conjunction with the accompanying drawings, wherein.

DESCRIPTION OF INVENTION

A flowmeter system in accordance with the invention makes use of any known form of volumetric flowmeter of the vortex type, in conjunction with a pressure-responsive sensor whose output is applied to an operational amplifier having a gain inversely related to the frequency of the applied signal, thereby producing an output signal proportional to the mass flow rate of the fluid being measured.

A vortex-type flowmeter is adapted to measure the flow rate of a fluid passing through a conduit by producing fluidic pulses or oscillations whose repetition rate or frequency varies in accordance with flow rate. Two species of vortex-type meters are commercially available in the United States, one being the so-called Swirlmeter type, and another, the bluff-body, vortex-shedding type. The present invention is not limited to these specific types and is applicable to all forms of hydrodynamic oscillatory metering devices in which fluidic variations are sensed to provide an indication.

In Swirlmeters, such as those described in U.S. Pat. Nos. 3,370,463; 3,279,251; 3,314,289 and Re.26,410, a homogeneous fluid whose flow rate is to be measured is forced to assume a swirl component. This is accomplished by feeding the fluid into the inlet section of a flow tube having a fixed set of swirl blades therein which imparts a swirling motion to the fluid passing therethrough. Downstream of the swirl blades in the tube is a Venturi section which first constricts and then expands the flow passage to transform the swirling motion into precessional movement in the expanding region of the Venturi section to create a vortex.

In the obstacle or bluff-body type of meter, such as that described in U.S. Pat. Nos. 3,116,639; 3,587,312 and 3,888,120, the body is mounted within the flow conduit transversely with respect to the flow axis thereof to create fluidic oscillations whose frequency is proportional to flow rate. The present invention encompasses all existing types of vortex meters, but for purposes of disclosure, the invention will be described in connection with a Swirlmeter.

Figure 1:
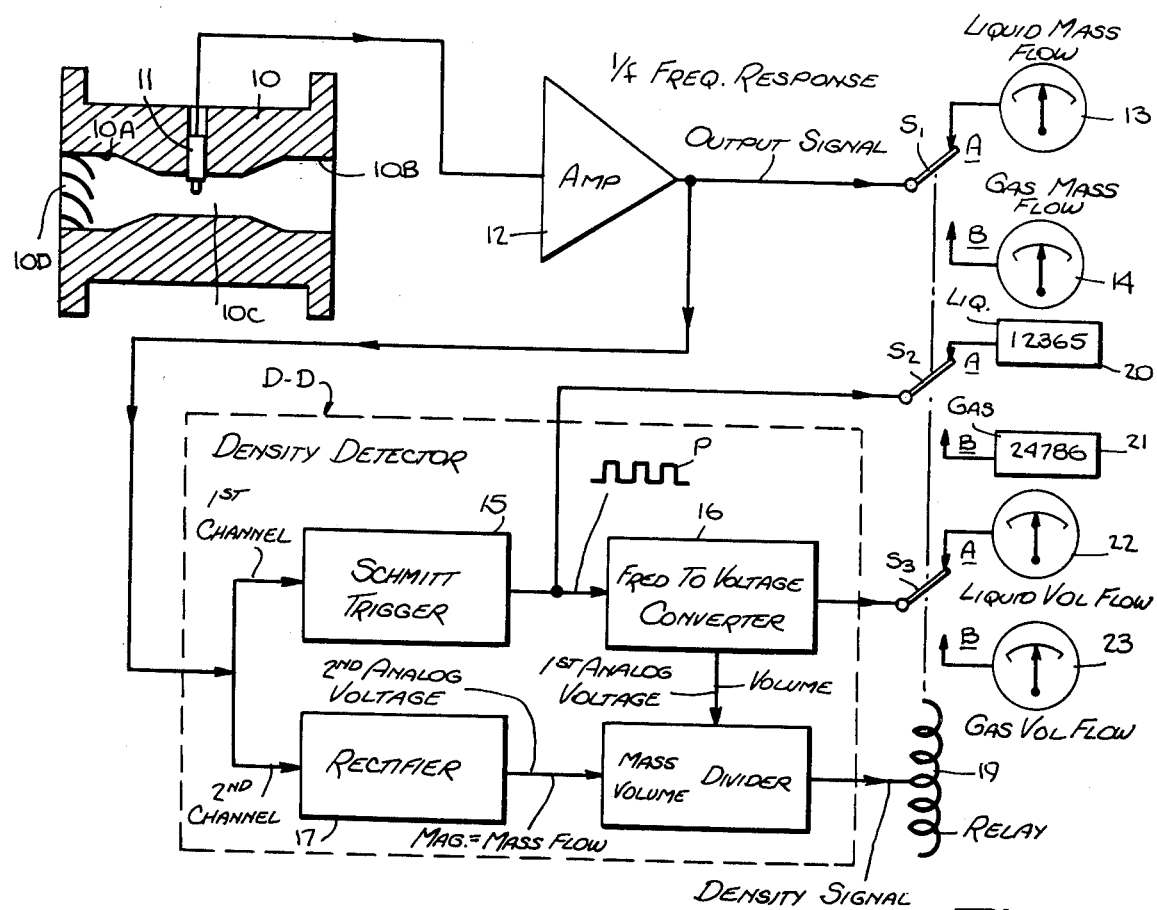
FIG. 1 is a block diagram of a vortex-type measuring system in accordance with the invention for use in metering a fluid stream in which gas is interspersed with oil or other liquid, the system providing separate volumetric and mass flow readings for the oil and gas.

Referring now to FIG. 1, a Swirlmeter, which includes a pressure sensor probe assembly and a signal processing circuit comprises a meter body constituted by a flow conduit or tube 10 having mounting flanges at either end thereof to facilitate the interposition of the meter in a line carrying fluid which is to be metered.

Flow type 10 is constituted by a cylindrical inlet section 10A, a cylindrical outlet 10B, and a Venturi section 10C interconnecting the inlet and output sections. Venturi section 10C is formed with an entrance region of decreasing cross-sectional area extending downstream from inlet section 10A to a constricted or throat region which leads to an exit region of increasing cross-sectional area communicating with outlet section 10B. Thus the Venturi serves to constrict the flow coming from the inlet section and to expand flow in advance of the outlet section.

Mounted within inlet section 10A is a fixed array of curved swirl blades 10D. To provide a strong signal and a high information rate, the curvature of the swirl blades is made such as to significantly deflect the incoming flow of fluid with respect to the longitudinal axis of flow tube 10.

Thus fluid entering inlet section 10A is forced by the array of swirl blades to assume a swirling motion, the swirling fluid being directed into Venturi section 10C. In the exit region of the Venturi where the increasing area gives rise to fluid expansion, the swirling flow is converted into precessional motion about the longitudinal axis of the tube. The frequency of precession depends on the volumetric flow rate.

Cyclic variations in local fluid velocity, as a result of the precessional motion, are detected by a sensor assembly generally indicated by numeral 11 and constituted by a probe which extends into Venturi section 10C at right angles to the longitudinal axis thereof and terminates in a pressure-responsive piezo-electric crystal transducer, whose output voltage is varied periodically in response to fluidic pressure changes produced by the precessing fluid.

In operation, pressure changes sensed by transducer 11 are converted into corresponding changes in amplitude in the signal generated by the transducer, the amplitude being a function of the kinetic energy contained in the fluid vortex in accordance with the following equation:

$$A = WV^2/2_g = K_1 WV^2 - K_2 X \text{ density } X f^2$$

where
$A$ is the amplitude of the transducer signal
$W$ is the fluid mass
$V$ is the fluid velocity
$g$ is the gravity
$f$ is the signal frequency
$K_{1,2}$ are constants.

If therefore we divide signal amplitude ($A$) by frequency ($f$), we obtain K times density times $f$, which equals mass flow. If we divide $f^2$, we obtain K times density. In order to divide the amplitude of the transducer signal by $f$, the output of transducer 11 is applied to an operational amplifier 12. The operational amplifier is provided with a frequency-responsive network imparting a $1/f$ characteristic to the amplifier. Hence the output of this amplifier is an A-C signal whose frequency is proportional to volumetric flow and whose amplitude is indicative of mass flow.

The present system, as explained previously, is also operable with vortex-type flowmeters such as that disclosed in Burgess U.S. Pat. No. 3,888,120. In this meter, an obstacle assembly is mounted in a flow tube through which the fluid to be metered is conducted. The assembly is formed by a front section fixedly mounted across the tube and a rear section cantilevered from the front section by means of a flexible beam to define a gap serving to trap the Karman vortices. Because the rear section is deflectable, it is excited into mechanical vibration by the vortices at a rate whose frequency is proportional to fluid flow.

In the Vortex Flowmeter Model 10 LV 100 manufactured by the Fischer & Porter Company of Warminster, Pennsylvania, the assignee of Burgess U.S. Pat. No. 3,888,120, as well as of the present application, a strain-gauge cartridge is used to sense the deflection of the rear section in relation to the fixed front section of an obstacle assembly.

The system disclosed in FIG. 1 is adapted to provide separate readings of volumetric and mass flow for a fluid stream passing through the meter which is in the form of gas interspersed with oil or another liquid. In order to distinguish between the mass flow of gas and oil, the output of amplifier 12 is applied through a single-pole, double-throw switch $S_1$ either to a liquid-mass flow indicator 13 or a gas-mass flow indicator 14.

The arrangement is such that when the presence of gas in the meter is sensed, the output signal of the mass flow meter from amplifier 12 is routed to the gas indicator, and when the presence of liquid in the meter is sensed, the output thereof is fed to the liquid indicator so that distinct indications of gas and oil mass flow are provided.

The presence of liquid or gas through the meter is determined by sensing the density of the passing fluid. This is accomplished by a density detector, generally designated as D—D, which includes a first channel that converts the output signal from the meter into a first analog voltage representing volumetric flow, and a second channel converting the output signal into a second analog voltage representing mass flow.

The first channel is formed by a Schmitt trigger 15 which changes the a-c output signal from amplifier 12 whose frequency is proportional to flow rate to square wave pulses P having a corresponding repetition rate. These pulses are applied to a frequency-to-voltage converter 16 which yields the first analog voltage whose magnitude is proportional to volumetric flow.

The second channel is formed by a rectifier 17 yielding a d-c voltage whose magnitude depends on the amplitude of the output signal from amplifier 12, and therefore constitutes the second analog voltage representing mass flow.

The first analog voltage from converter 16 and the second analog voltage from rectifier 17 are applied to an analog divider 18 to produce a third analog voltage whose magnitude is determined by the second analog voltage divided by the first analog voltage to provide a signal representing density. That is:

2nd Analog (Mass) /1st Analog (Volume) = 3rd Analog (Density)

A simple and inexpensive analog divider suitable for this purpose is the unit MC 1495 L manufactured by the Motorola Corporation. This unit is a wide-band monolithic four-quadrant multiplier designed to produce an output (multiple, divide, etc.) which is a linear product of two input voltages. This divider has excellent temperature stability and a wide input voltage range.

Since there is a large difference between the density of liquid and that of gas, the level of the density signal yielded by detector D—D when oil passes through the meter is much higher than when gas passes therethrough. Thus the density signal yielded by the detector is markedly different for oil and water.

The density signal is applied to a relay 19 which actuates a ganged set of three single-pole, double-throw switches $S_1$, $S_2$ and $S_3$ in a manner whereby the armature or pole of each switch is caused to engage a fixed contact A when the density signal level is indicative of oil (or other liquid) and is caused to engage fixed contact B when the density signal level is indicative of gas.

Switch $S_1$, as pointed out previously, selectively connects the output of amplifier 12 to indicators 13 and 14, the switch acting to feed the output signal of the vortex meter to the liquid-mass flow indicator 13 when liquid is detected, and to the gas-mass flow indicator 14 when gas is detected.

Switch $S_2$ routes the output pulses from Schmitt trigger 15 either to a liquid-volumetric flow digital register 20 or to a gas-volumetric flow register 21. Since the repetition rate of the pulses P produced by the Schmitt trigger is proportional to volumetric flow, register 20 indicates volumetric flow when oil is present and contact A of switch $S_2$ is engaged, while register 21 indicates volumetric flow when gas is present and contact B is engaged. Switch $S_3$ directs the output of converter 16 through the A contact to a liquid-volume flow indicator 22, and through the B contact to a gas-volume flow indicator 23. Since converter 16 produces the first analog voltage proportional to volumetric flow, the system is capable of displaying volumetric flow as well as mass flow for gas or liquid on an analog scale, whichever fluid is present.

Because the difference in densities between liquid and gas is very large, the requirements for the density detector are by no means critical, and this device may be constructed of low-cost components, for all this detector need do is to discriminate between markedly different density values.

Oil-Water Ratio

Figure 2:
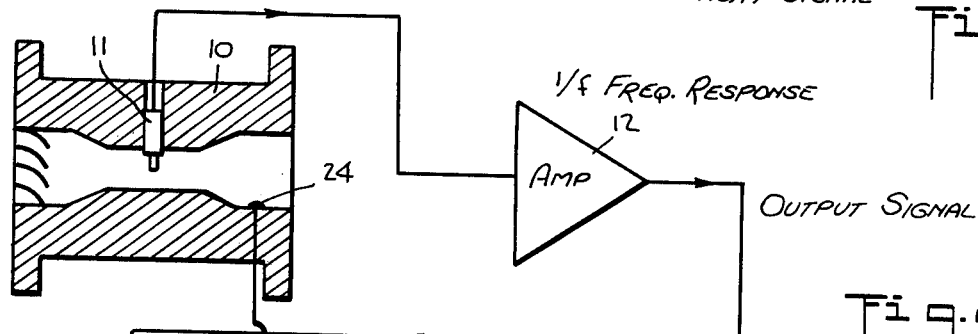
FIG. 2 is a block diagram of a vortex-type measuring system in accordance with the invention for use in metering a fluid stream in which oil and water are intermixed, the system determining the ratio of oil-to-water.
Figure 2:
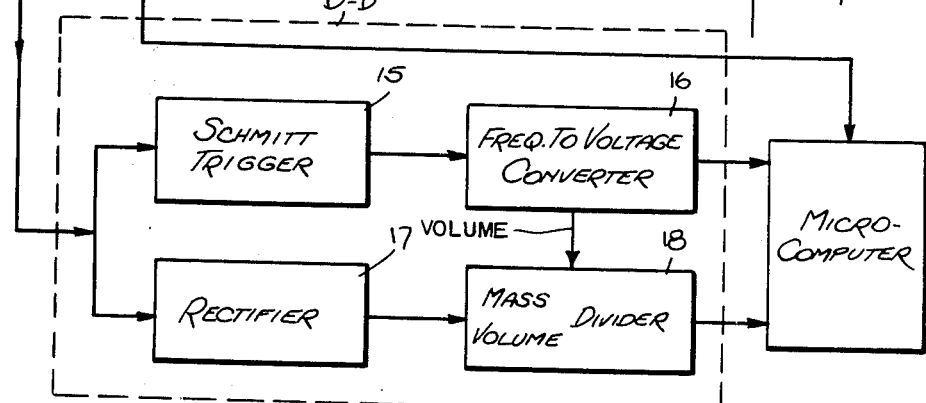

We shall now, in conjunction with FIG. 2, consider a situation in which the stream passing through the vortex meter is a mixture of oil and water; hence is composed of two liquids having different densities.

In order to determine the relative volume of oil and water in this mixture, the vortex meter is provided with a temperature sensor 24 as well as pressure sensor 11. Temperature sensor 24 yields a signal whose level represents the temperature of the mixture passing through the meter.

In determining the ratio of oil to water, the following factors must be taken into account:
$X$ = volume of water in mixture
$Y$ = volume of oil in mixture
$X + Y$ = total volume of mixture $D$ = density of mixture.

The following equation expresses the relationship of water to oil:

$X \cdot \text{Water Density} + Y \cdot \text{Oil Density} = X + Y \cdot D$

If the temperature of the oil-water mixture is known, one can, from data available in a technical handbook, find out the water density and the oil density. And if the values of water density, oil density, mixture density and total volume (X + Y) are known, one can easily solve for X and Y in the above equation.

The solution of this equation is effected by a microcomputer 25 whose memory stores the relationship between water density versus temperature and oil density versus temperature. Fed into micro-computer 25 is the temperature signal from sensor 24, thereby making it possible for the computer to determine the prevailing density values of the water and the oil in the mixture.

Also fed into micro-computer 25 is the density of the mixture, this being obtained from the output of divider 18, for the divider yields the third analog voltage representing the density of liquid passing through the meter. Also applied to the micro-computer is the output of converter 16, which is the second analog voltage representing the total volume of the mixture.

Hence the micro-computer, using the temperature data entered therein, provides the water and oil density values in the above equation, and entering the total volume value derived from converter 16 and the mixture density value derived from divider 18, is then able to solve for X and Y, the respective volumes of oil and water. In practice, the microcomputer may obtain the total volume in digital form from Schmitt trigger 15 and internally carry out the function of divider 18, thereby dispensing with this divider.

While there have been shown and described preferred embodiments of a vortex-type meter system in accordance with the invention, it will be appreciated that many changes and modifications may be made therein without, however, departing from the essential spirit thereof.

I claim:

1. A system for metering a fluid stream constituted by a mixture of oil and water to determine the volumetric ratio of oil to water in said mixture, said system comprising:

A. a vortex meter having a flow tube through which the stream is conducted to produce a meter signal whose frequency depends on the volumetric flow and whose amplitude depends on the mass flow of the stream;

B. means solely responsive to the frequency of the meter signal to produce a volumetric flow signal;

C. means solely responsive to the amplitude of the meter signal to produce a mass flow signal;

D. means to divide the volumetric flow signal by the mass flow signal to produce a density signal;

E. means to sense the temperature of the stream passing through said tube to produce a temperature signal; and F. an electronic computer whose memory has stored therein the relationship between water density and temperature and the relationship between oil density and temperature, said computer having fed thereto said volumetric, density and temperature signals and determining the respective volumes of oil and water in said mixture.

2. A system as set forth in claim 1, wherein said vortex meter is provided with swirl blades causing the fluid passing through the flow tube to precess to produce fluidic oscillations sensed by a pressure sensor.

3. A system as set forth in claim 2, wherein said pressure sensor includes a piezoelectric element to generate said meter signal.

4. A system as set forth in claim 1, wherein said vortex meter is provided with an obstacle assembly producing a Karman vortex street, said assembly having a deflectable section which is caused to vibrate at a frequency determined by the vortices, and a strain gauge sensor mounted on said assembly to sense said vibrations to produce said meter signal.

5. A system as set forth in claim 1, wherein said means to produce said volumetric, mass flow, and density signals comprises a first channel responsive to the meter signal to produce a first analog voltage which depends on the frequency of the meter signal, a second channel responsive to said meter signal to produce a second analog voltage which depends on the amplitude of the meter signal on said second channel, said second channel including means to divide the second analog voltage by the first analog voltage produced by the first channel to yield a third analog voltage which depends on density and therefore constitutes said density signal.

6. A system as set forth in claim 5, wherein said first channel is formed by a Schmitt trigger which produces pulses at a rate corresponding to the frequency of the output signal, and a frequency-to-voltage converter to convert the pulses to said first analog voltage.

7. A system as set forth in claim 5, wherein said means to divide the analog voltages is constituted by an analog voltage divider.

8. A system as set forth in claim 1, wherein the division of the volumetric flow and mass flow signals is effected by said computer.

* * * * *